United States Patent
Wei et al.

(10) Patent No.: US 9,966,781 B2
(45) Date of Patent: May 8, 2018

(54) APPARATUS FOR BATTERY CHARGER WITH CONTROLLED CHARGE CURRENT AND ASSOCIATED METHODS

(71) Applicant: Silicon Laboratories Inc., Austin, TX (US)

(72) Inventors: Dazhi Wei, Austin, TX (US); Praveen Kallam, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 233 days.

(21) Appl. No.: 14/979,516

(22) Filed: Dec. 28, 2015

(65) Prior Publication Data

US 2017/0187199 A1 Jun. 29, 2017

(51) Int. Cl.
*H01M 10/44* (2006.01)
*H01M 10/46* (2006.01)
*H02J 7/00* (2006.01)

(52) U.S. Cl.
CPC ............ *H02J 7/007* (2013.01); *H02J 7/0052* (2013.01)

(58) Field of Classification Search
CPC . H02J 7/0026; H02J 7/0021; H02J 2007/0095
USPC .................. 320/107, 114, 128, 138, 157, 162
See application file for complete search history.

(56) References Cited

U.S. PATENT DOCUMENTS

| | | | |
|---|---|---|---|
| 7,271,568 B2 | 9/2007 | Purdy et al. | |
| 7,656,127 B1 | 2/2010 | Shutt | |
| 9,059,590 B2 | 6/2015 | Cassidy | |
| 9,063,559 B2 | 6/2015 | Ivanov | |
| 9,083,199 B2 | 7/2015 | Do Valle | |
| 9,093,855 B2 | 7/2015 | Zhu | |
| 9,178,407 B2 | 11/2015 | Gurlahosur | |
| 2001/0043050 A1* | 11/2001 | Fisher, Jr. ............. | H02J 7/0068 320/101 |
| 2005/0062457 A1 | 3/2005 | Galant et al. | |
| 2009/0009137 A1 | 1/2009 | Zhang | |
| 2011/0279079 A1 | 11/2011 | Do Valle | |
| 2012/0194141 A1 | 8/2012 | Shi et al. | |
| 2014/0125272 A1* | 5/2014 | Weissinger ........... | H02J 7/0077 320/107 |
| 2015/0015204 A1 | 1/2015 | Sorias et al. | |
| 2015/0069951 A1 | 3/2015 | Wang et al. | |
| 2015/0102765 A1 | 4/2015 | Lee et al. | |
| 2015/0340897 A1* | 11/2015 | Uan-Zo-Li ............ | H02J 7/0054 320/103 |
| 2016/0006272 A1 | 1/2016 | Greening | |

OTHER PUBLICATIONS

U.S. Appl. No. 14/979,514, filed Dec. 2015, Thomsen et al.
DS1340, I2C RTC with Trickle Charger, Apr. 2013, 17 pgs.

(Continued)

*Primary Examiner* — Edward Tso
(74) *Attorney, Agent, or Firm* — Law Offices of Maximilian R. Peterson (57) ABSTRACT

An apparatus includes a voltage regulator to regulate a voltage from a power source and to provide an output current at an output. The apparatus further includes a battery charger, coupled to the voltage regulator, to provide a charge current. The apparatus further includes a controller to control the charge current such that the charge current is less than or equal to a current available from the power source minus the output current.

20 Claims, 8 Drawing Sheets

(56) References Cited

OTHER PUBLICATIONS

NiCd/NiMH Battery Fast-Charge Controllers, Apr. 2002, 17 pgs.
Sealed Lead-Acid Battery Charger, May 2005, 18 pgs.
Office communication in U.S. Appl. No. 14/979,514, dated Dec. 14, 2017 (13 pgs.).

* cited by examiner

APPARATUS FOR BATTERY CHARGER WITH CONTROLLED CHARGE CURRENT AND ASSOCIATED METHODS

TECHNICAL FIELD

The disclosure relates generally to electronic circuitry and, more particularly, to apparatus for battery charging, such as power path battery charging, and associated methods.

BACKGROUND

Batteries have long been used as a means of storing electrical energy. The ability to store electrical energy has provided a way of powering electrical and electronic circuitry in situations where access to the utility grid does not exist or is limited. Furthermore, in the case of mobile electrical or electronic devices, the very design and nature of the device assumes operation without a connection to the utility grid. The market penetration of mobile electronic devices has increased the use of batteries.

A wide variety of devices, such as tablets, laptops, notebooks, cellular phones, and the like have been adopted by the general population in increasing numbers. Use of batteries to power the device has allowed the creation and proliferation new technologies. In order to enable operation when not connected to the utility grid, batteries are charged, typically from the utility grid or another source of power, such as solar panels, wind generators, and the like.

The description in this section and any corresponding figure(s) are included as background information materials. The materials in this section should not be considered as an admission that such materials constitute prior art to the present patent application.

SUMMARY

A variety of battery charging apparatus, such as power path battery chargers, and associated methods are contemplated. According to one exemplary embodiment, an apparatus includes a voltage regulator to regulate a voltage from a power source and to provide an output current at an output. The apparatus further includes a battery charger, coupled to the voltage regulator, to provide a charge current. The apparatus further includes a controller to control the charge current such that the charge current is less than or equal to a current available from the power source minus the output current.

According to another exemplary embodiment, an apparatus includes a voltage regulator to provide an output current to a load. The voltage regulator includes a first transistor to selectably provide the output current using a first power source, and a second transistor to selectably provide the output current using a second power source. The apparatus further includes a battery charger coupled to the voltage regulator that provides a charge current. The apparatus further includes a controller to control the charge current such that the charge current is derived from (a) a maximum current available from the first power source and (b) the output current.

According to another exemplary embodiment, a method of processing power includes regulating a voltage from a power source and providing an output current, and providing a charge current from a battery charger coupled to the voltage regulator. The method further includes controlling the charge current such that the charge current is less than or equal to a current available from the power source minus the output current.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to battery chargers. More specifically, the disclosed concepts provide apparatus and methods for charging batteries (e.g., power path battery charging), while having the capability of accommodating supply current/power limits and/or providing power to loads/circuits in the event of supply loss or lack of sufficient capacity to power loads/circuits, as described below in detail.

Furthermore, in exemplary embodiments, battery chargers are employed together with power regulators (e.g., a voltage regulator; generally, regulator) to provide a power path circuit or power conversion circuit. Such circuits provide variety of benefits, such as the ability to accommodate a variety of charging processes, patterns, stages, phases, etc. (generally, modes), automatically changing or making a transition from one charging mode to another as a function of time and/or battery or system conditions or parameters, etc. Those features and other benefits and attributes are described below in detail.

Figure 1:
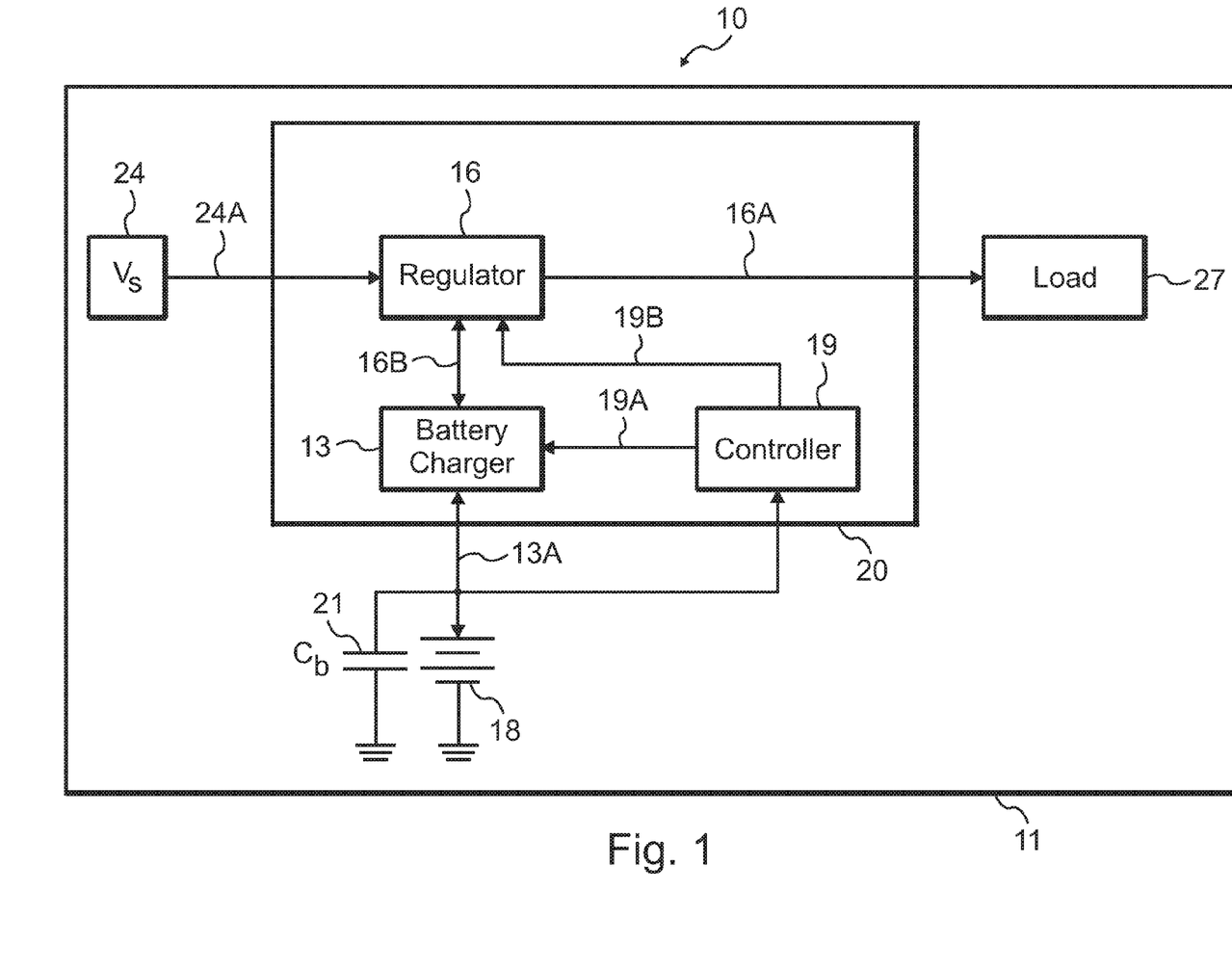
FIG. 1 illustrates a circuit arrangement according to an exemplary embodiment that includes a regulator and a battery charger.

FIG. 1 illustrates a circuit arrangement 10 according to an exemplary embodiment that includes a regulator and a battery charger. Circuit arrangement 10 includes an apparatus 11, which includes power converter or power processor (or power processing circuit) or power path circuit or power conversion circuit 20.

Power converter 20 includes battery charger 13 and regulator 16. Regulator 16 receives power from a power source or power supply, such as a voltage source $V_s$, labeled 24. Regulator 16 regulates the input signal 24A, e.g., a voltage, from power source 24 and generates an output voltage 16A.

Note that, in some embodiments, rather than a voltage, power source 24 may provide a current to regulator 16. As another example, in some embodiments, power source 24 may provide a voltage during one period of time, and a current during another period of time, to regulator 16.

Referring again to the embodiment in FIG. 1, regulator 16 has an output 16A, which is coupled to load 27. In some embodiments, output 16A provides a regulated voltage signal to load 27. In some embodiments, output 16A provides a regulated current signal to load 27.

Generally, load 27 may have a wide variety of forms. For example, load 27 may include a variety of circuitry (e.g., analog circuitry, digital circuitry, mixed-signal circuitry), a system, a subsystem, or a circuit, circuit block, or a set of circuit blocks that is part of a larger system, subsystem, etc.

As an example, load 27 may constitute mobile equipment, such a cellular telephone. In this situation, load 27 may include some or all of the devices and/or circuitry in the telephone. Examines include digital signal processor(s) (DSPs), MCUs, audio circuitry and devices, video or graphics circuitry or devices, including touch-screens, control circuitry, interface circuitry, keypads, and the like.

Regulator 16 also provides power to battery charger 13 via output 16B. In some embodiments, output 16B provides the voltage from power source 24 to battery charger 13. In some embodiments, regulator 16 may regulate or otherwise convert the voltage from power source 24 and provide the resulting voltage (or current, as desired) to battery charger 13.

Battery charger 13 uses the voltage (or current) from regulator 16 to charge battery 18 via output 13A. More specifically, battery charger 13 converts the input voltage (or current) from regulator 16 to generate and provide to battery 18 the charge signal. The charge signal provides charge to battery 18 (causes battery 18 to charge), as described below in detail. In exemplary embodiments, the charge signal may have a variety of forms to accommodate desired or specified battery charging modes, as described below in detail.

In order to provide the charge signal, the charge circuit may include a variety of circuitry. The choice of circuitry depends on design and performance specifications, cost, whether the circuit is integrated, type of battery, current and/or voltage levels involved (e.g., the differential between the supply voltage and the voltage level(s) used to charge battery 18).

The circuitry in regulator 16 and battery charger 13 may include a variety of devices. Examples include transistors, such as metal oxide semiconductor field effect transistors (MOSFETs), diodes, resistors, current mirrors, reference source (e.g., current source, voltage source), and the like. The choice of the type and number of devices depends on various factors, such as the type and topology of regulator 16 and battery charger 13 used in a particular implementation.

In some embodiments, such as the embodiment shown in FIG. 1, a bypass capacitor 21 (labeled $C_b$) may be coupled across battery 18. Bypass capacitor 21, as the name suggests, provides bypass current in the situations where relatively large current changes are encountered, and also filters high frequency ripple voltages across battery 18. In some embodiments, bypass capacitor may be external to battery charger 13 (e.g., as shown in FIG. 1). In some embodiments, however, depending on factors such as the size of capacitor 21, available technology, etc., capacitor 21 may be included with or integrated with battery charger 13.

Controller 19 controls various operations of power converter 20. More specifically, controller 19 uses output 19A to provide one or more control signals to battery charger 13. In response, battery charger 13 performs one or more operations that depend on the content or state of the signal(s) provided at output 19A. In some embodiments, battery charger 13 may provide information to controller 19, such as status signals, handshaking signals, etc.

Furthermore, controller 19 uses output 19B to provide one or more control signals to regulator 16. In response, regulator 16 performs one or more operations that depend on the content or state of the signal(s) provided at output 19B. In some embodiments, regulator 16 may provide information to controller 19, such as status signals, handshaking signals, etc.

Controller 19 uses or derives information or parameters, such as charge information (e.g., the type of charging or charge profile desired, the number and type of stages of charging, e.g., constant voltage, constant current, precharge, float charge, etc.). Controller 19 also uses or derives information or parameters, such as desired output signal, e.g., a voltage (or current), at output 16A of regulator 16, an over-voltage threshold for the signal at output 16A, an under-voltage threshold for the signal at output 16A, an overload (excessive current) threshold for the signal at output 16A, an under-load (insufficient current) threshold for the signal at output 16A, and/or type of signal at output 16A (voltage, current, composite as a function of time), etc.

Controller 19 may also use or derive other information or parameters, such as system parameters. Examples include the level of current available to supply load 27, the level of current available for charging battery 18, the voltage level or supply available for charging the battery, temperature of one or more circuits (such as, or including, the temperature of cell(s) in battery 18, battery charger 13, and/or regulator 16), etc.

Using the temperature levels alone or in combination with other information (battery terminal voltage, battery charge current, regulator output voltage and/or current, etc.) may be used to implement battery, regulator, and/or battery charger protection schemes. In other words, a rise or fall in temperature of one or more components (e.g., one or more devices in regulator 16, battery charger 13, and/or battery 18, etc.) beyond a given or desired threshold may be used (optionally with voltage and/or current information, described above) to reduce the battery charging current and/or voltage or to stop charging altogether or to reduce the output power of regulator 16 or to stop providing power to load 27, etc.

Controller 19 may control various operations of regulator 16 and battery charger 13 in a flexible manner. In some embodiments, regulator 16 and/or battery charger 13 (e.g., through controller 19) may take into account one or more conditions or parameters of the system or subsystem in which it is includes or within or with which it operates. For example, as noted above, in some embodiments, temperatures of one or more circuit or system blocks, components, circuits, etc., may be taken into account.

For instance, if the temperature of one or more cells of battery 18 rises or falls beyond or below, respectively, a certain or given level (e.g., a threshold), controller 19 may cause a reduction in the level of voltage and/or current used to charge battery 18 (or cease or stop or terminate the charging of battery 18). As another example, depending on factors such as the temperature of one or more devices in regulator 16 and/or battery charger 13 (e.g., a transistor used to provide charging current or voltage to battery 18), controller 19 may take appropriate or corrective action to protect one or more components in apparatus 11, such as cause a reduction in the level of voltage and/or current used to charge battery 18 (or cease or stop or terminate the charging of battery 18).

In addition to, or instead of, using temperature to control the charging and/or regulation process, other variables or parameters may be used. For example, in some embodiments, controller 19 may cause a reduction in the level of voltage and/or current provided by regulator 16, may cause a reduction in the level of voltage and/or current used to charge battery 18 (or cease or stop or terminate the charging of battery 18) if the power source's voltage exceeds or falls below certain levels, respectively (e.g., thresholds), etc.

As another example, in some embodiments, controller 19 may cause a reduction in the level of voltage and/or current provided to load 27 and/or may cause a reduction in the level of voltage and/or current used to charge battery 18 (or cease or stop or terminate the charging of battery 18) if the current drawn from (or available from) supply voltage and/or battery 18 exceeds a certain level (e.g., a threshold). Other types of control schemes, based on one or more other conditions, parameters, etc. in battery charger 13 and/or regulator 16 (or other blocks, circuits, subsystems, etc.) may be used to provide flexible techniques for providing power to load 27 and/or charging battery 18 while responding to various conditions, such as conditions that impact the safety or longevity of circuit components or elements, battery 18, power source 24, etc.

In some embodiments, battery 18 may include an intelligent or "smart" controller, such as an MCU, or other device, circuit. In those situations, controller 19 may communicate with such a controller via a communication link (not shown) to exchange one or more status and/or control signals. In this manner, controller 19 may coordinate charging of battery 18 with such a controller.

Furthermore, in some embodiments, battery 18 may include a temperature sensor, such as a resistor whose resistance varies as a function of temperature. Battery 18 may provide temperature information from such as sensor to controller 19. In this manner, controller 19 may coordinate charging of battery 18 using the temperature information received from battery 18.

Furthermore, as noted above, apparatus 11 may include other circuitry, blocks, subsystems, systems, etc. that couple to and communicate or function with battery charger 13. For example, apparatus 11 may include an MCU (not shown) that communicates with regulator 16 and/or battery charger 13 over a link (not shown), such as a coupling mechanism (wires, traces, etc.), bus, etc.

In some embodiments, the MCU may be integrated together with regulator 16 and/or battery charger 13 in an IC. In some embodiments, the MCU may be integrated in a separate IC than regulator 16 and/or battery charger 13. In such a situation, the MCU and regulator 16 and/or battery charger 13 may communicate via a bus or traces on a printed circuit board (PCB) with battery charger 13.

In some embodiments, the MCU may be integrated in one semiconductor die, whereas regulator 16 and/or battery charger 13 is integrated in another semiconductor die (or two semiconductor die, one for each of regulator 16 and battery charger 13, respectively). The two die may be included within a multi-chip module (MCM). The die may be linked via a bus or other coupling mechanism.

In embodiments where apparatus 11 includes an MCU (not shown), the MCU may coordinate its operations with the operations of regulator 16 and/or battery charger 13. For instance, the MCU may control operations of regulator 16 and/or battery charger 13, such as provide load characteristics, the various levels for the signal at output 16A of regulator 16, available current for providing power to load 27 and/or charging battery 18, battery, charging, and/or system parameters, variables, and/or other information to regulator 16 and/or battery charger 13.

Furthermore, regulator 16 and/or battery charger 13 may communicate information to the MCU. For example, regulator 16 and/or battery charger 13 may provide to the MCU status, information, data, etc. (e.g., the state of the battery charging process, the battery voltage, charging mode (constant current, constant voltage, etc.), charging voltage or current, level of voltage or current at output 16A, etc).

In the embodiment shown in FIG. 1, battery charger 13 uses a negative feedback loop to charge battery 18. Specifically, a negative feedback loop that includes controller 19 receives and uses the terminal voltage of battery 18 to control the charging process or modes. Thus, the terminal voltage of battery 18 in part determines the nature or characteristics of charge signal 13A used to charge battery 18.

In exemplary embodiments, apparatus 11 may take a variety of forms. For example, in some embodiments, apparatus 11 may constitute a system, a subsystem, or a circuit block that is part of a larger system, subsystem, etc. Apparatus 11 may include a variety of other circuitry, such as signal processing circuitry, digital processing circuitry, computing/processing circuitry, power converters, etc., as persons of ordinary skill in the art will understand.

As another example, in some embodiments, apparatus 11 may include an integrated circuit (IC). In some embodiments, the IC may include digital circuitry, such as processing core(s), general logic circuits, etc. In some embodiments, the IC may include mixed-signal circuitry, including analog circuitry and digital circuitry.

In some embodiments, apparatus 11 may include power management circuitry, such as a power management unit (PMU). The PMU may include, or operate with, a digital battery charger (e.g., the PMU and the regulator and/or battery charger may be integrated together within an IC). The PMU may also include circuitry to supervise, control, or perform various power conversion and control or management tasks. For example, the PMU may include power converters, control circuitry for power converters, sensors, control circuits, and the like, as persons of ordinary skill in the art will understand.

As noted above, in the embodiment shown in FIG. 1, battery charger 13 uses a negative feedback loop to charge battery 18, based on the terminal voltage of battery 18. In addition to (or instead of, in some situations) using the terminal voltage of battery 18, in some embodiments, the charge current (i.e., the current provided by battery charger 13 to battery 18, for instance through charge signal 13A) may be used in the negative feedback mechanism of battery charger 13.

Figure 2:
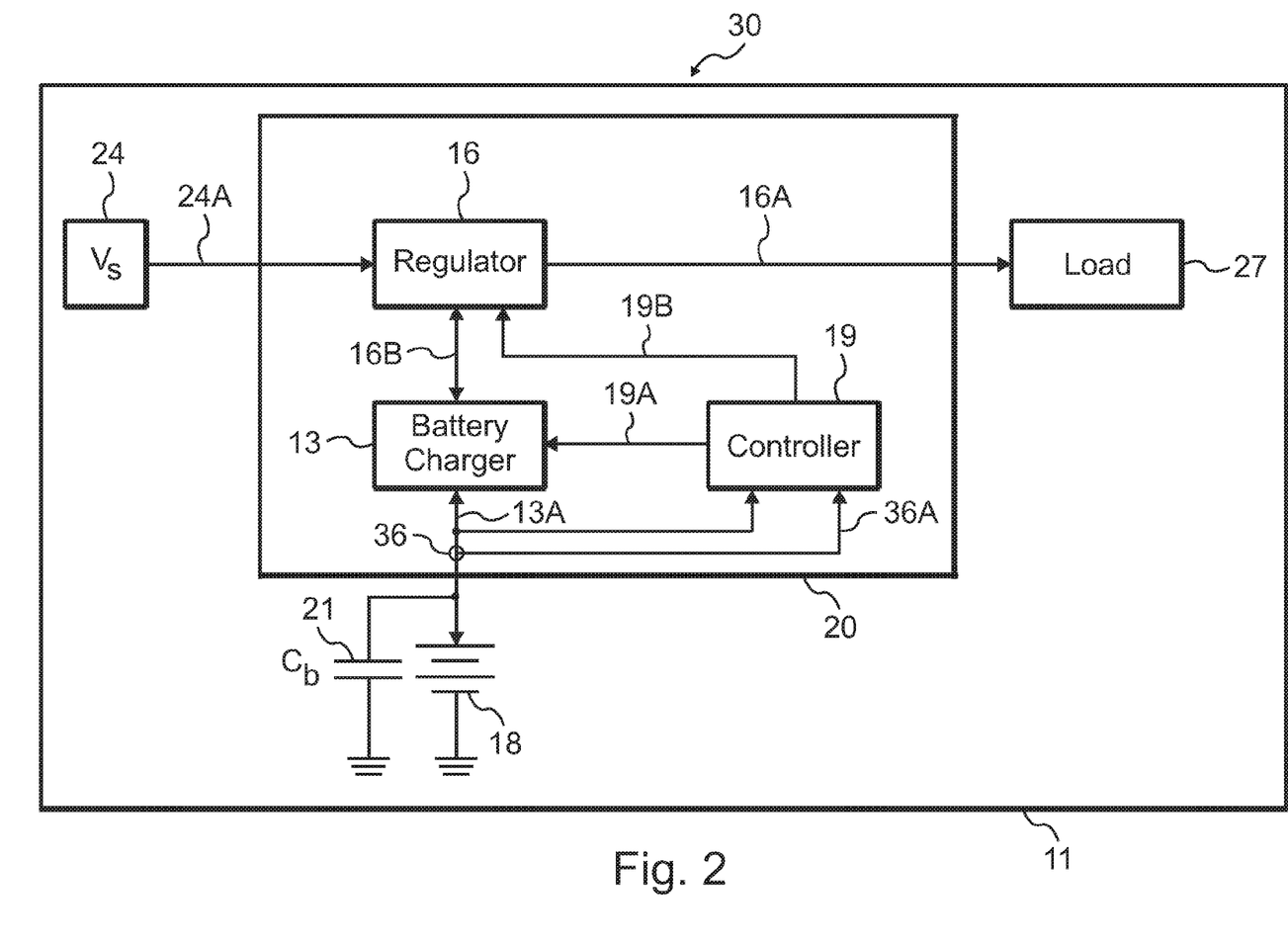
FIG. 2 depicts a circuit arrangement according to another exemplary embodiment that includes a regulator and a battery charger.

FIG. 2 depicts a circuit arrangement 30 according to another exemplary embodiment that uses a current signal as part of a negative feedback mechanism used by battery charger 13. More specifically, battery charger 13 in circuit arrangement 30 receives a current signal 36A from current sensor 36. Current signal 36A is derived from or represents the current (typically, charge current 13A) flowing through battery 18.

Controller 19 receives current signal 36A, and implements a negative feedback loop that uses not only the terminal voltage of battery 18, but also the current flowing through battery 18. In some situations, using both the terminal voltage of battery 18, but also the current flowing through battery 18 in a feedback loop, allows more flexibility, easier control, more comprehensive control, etc.

In exemplary embodiments, current sensor 36 may have a variety of forms or may use a variety of circuitry or devices. For example, current sensor 36 may constitute a resistor coupled in series with battery 18 (or two resistors, each coupled to a respective terminal of battery 18). The voltage across the resistor provides a measure of the current flowing through the resistor, hence, through battery 18.

As another example, current sensor 36 may constitute or use a Hall effect sensor, for instance, coupled in a feedback loop with an amplifier. As another example, current sensor 36 may constitute or use a sense field effect transistor (FET). Two FETs having the same gate-to-source voltage will conduct the same, or nearly the same, current, as scaled by a ratio, such as the ratio of the respective sizes of the two FETs.

As yet another example, in some embodiments, current sensor 36 may be included in the battery pack that houses or includes battery 18. In such a situation, the battery pack provides current signal 36A to controller 19. In some embodiments, the battery pack may provide a digital signal that is representative of the current flowing through battery 18.

As noted above, charge signal 13A, provided by battery charger 13, may have a variety of forms to accommodate desired or specified battery charging modes. In other words, the quality (type) and quantity (level) of charge signal 13A may be varied by controller 19 in order to accommodate various types of battery 18, different system conditions (e.g., amount of current or power available from power source 24, the amount of power or current provided to load 27, etc.), and/or user input (e.g., desired to switch charging modes), etc. An example of some of the charging modes that battery charger 13 can accommodate are described below in connection with FIG. 3.

Figure 3:
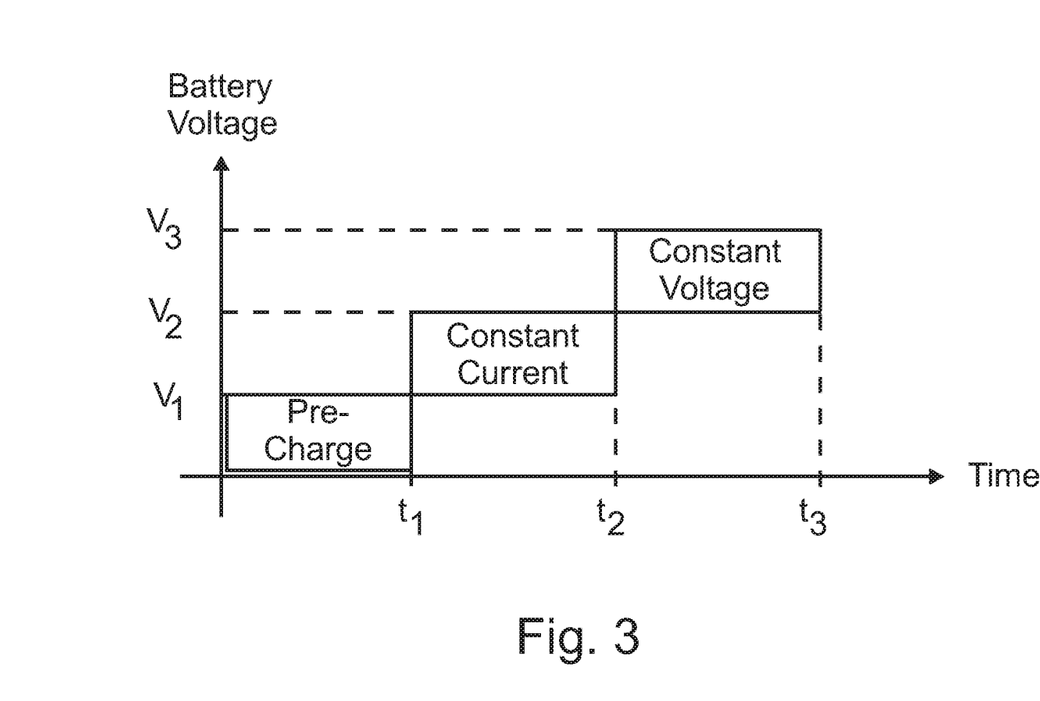
FIG. 3 shows various stages of battery charging using a battery charger according to an exemplary embodiment.

More specifically, FIG. 3 shows an example according to an exemplary embodiment of the various stages or modes of charging a battery 18, using a battery charger 13. More specifically, the figure shows the battery charging modes as a function of time.

In the example of FIG. 3, battery charging battery charging begins with a pre-charge mode. In this mode, battery charger 13 provides a specified or desired amount of current or voltage (depending on factors such as the type of battery, battery capacity, battery chemistry, etc.) to battery 18.

At time $t_1$, the terminal voltage of the battery reaches the voltage shown as $V_1$. At that time, battery charger 13 leaves the pre-charge mode, and enters a constant current mode. During this mode, battery charger 13 provides a constant (or nearly constant, in a real-world, physical implementation) current to battery 18 as a function of time.

At the conclusion of the constant current mode, the terminal voltage of battery 18 reaches voltage $V_2$ at time $t_2$. At that time, battery charger 13 leaves the constant current mode and switches to or enters the constant voltage mode of operation. During this mode, battery charger 13 provides a constant (or nearly constant, in a real-world, physical implementation) voltage $V_3$ to battery 18 as a function of time. The value of voltage $V_3$ can be higher or equal to the value of voltage $V_2$, as desired.

In the example shown, battery charger 13 terminates charging at time $t_3$. Battery charger 13 may terminate charging in response to an occurrence of an event, such as the terminal voltage of battery 18 reaching a desired or target or threshold value, shown as $V_3$, or the current through battery 18 falling below a desired or target or threshold value, at time $t_3$. Thereafter, battery charger 13 may provide a float charge (not shown in FIG. 3) to battery 18, as desired.

Figure 4:
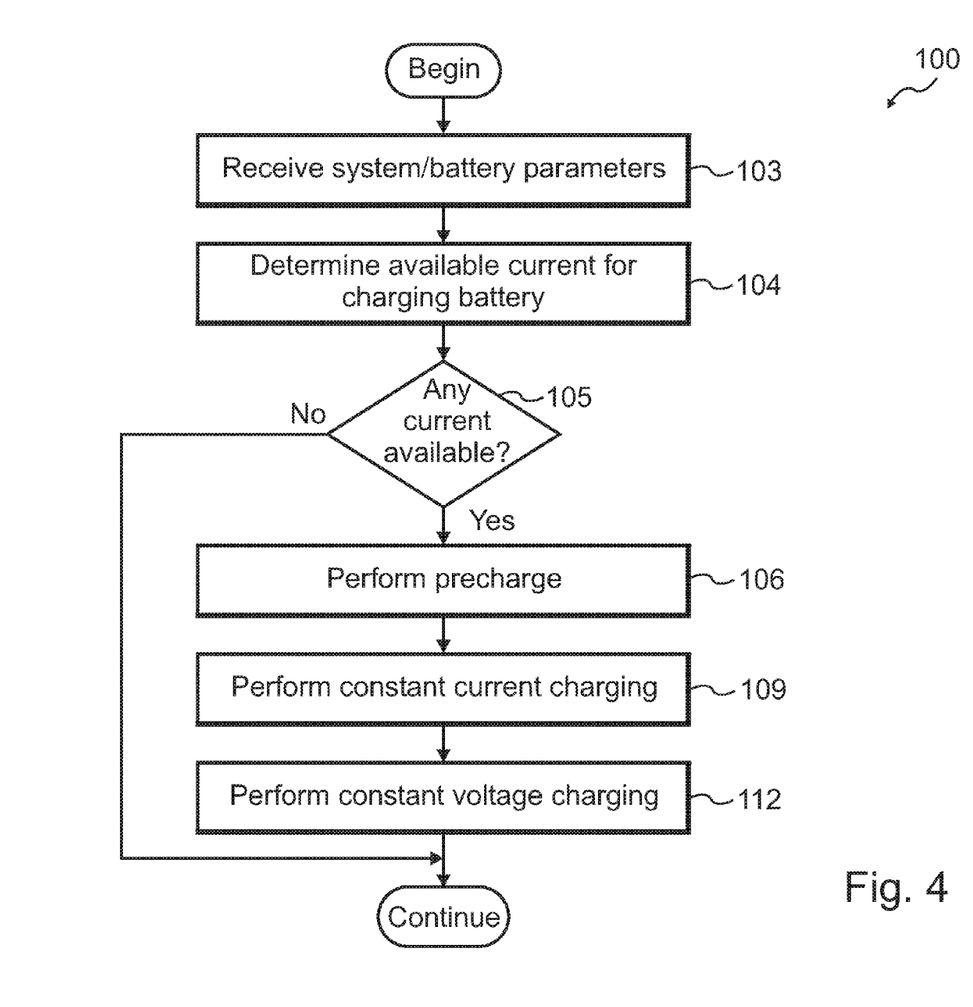
FIG. 4 illustrates a flow diagram for a process of charging a battery according to an exemplary embodiment.

FIG. 4 depicts a flow diagram 100 for a process of charging battery 18. Generally, controller 19 causes appropriate steps or tasks or operations to be performed in order to perform the battery charging process. The example shown in FIG. 4 corresponds to the battery charging stages or modes shown in FIG. 3. Other charging processes are contemplated, and can be accommodated in exemplary embodiments.

Referring again to FIG. 4, at 103, battery charger 13 receives battery and/or system conditions or parameters, information, etc., as described above. In exemplary embodiments, the parameters include information about the battery charging process, such as the various charging modes, conditions for each mode (e.g., start conditions or time, stop conditions, such as threshold voltages, etc.), and/or the order of the charging modes and/or parameters or information about regulator 16 (e.g., output voltage), load 27 (power or voltage or current consumption), etc.

At 104, the current (assuming a fixed or nearly fixed level of $V_s$) or power (general case, where $V_s$ may vary as a function of time) available for charging battery 18 is determined. More specifically, in a typical situation, for example in portable equipment, equipment powered from alternative energy sources (e.g., from a solar panel), or equipment powered from sources such as universal serial bus (USB) ports, power source 24 (one or more of the foregoing sources) has a limited current capability. In other words, power source 24 can supply power up to a specified maximum level, e.g., a given amount of current at a specified voltage, such as 500 mA at 5V for a USB port.

As an example, suppose that power source 24 ($V_s$) can supply or is capable of providing a maximum current denoted as $I_{s,\ max}$. In other words, the maximum current available from $V_s$ is $I_{s,\ max}$. For instance, in the case of a USB port serving as power source 24, the USB port may have a maximum output current capability of 500 mA ($I_{s,\ max}$). If, in addition to battery charger 13 another device is also drawing current, say, 100 mA ($I_s$), from the USB port, (such as load 27 receiving power from regulator 16, thus drawing 100 mA), then the maximum available current from the USB port for charging a battery would be (500 mA-100 mA), or 400 mA, in the example above. Controller 19 controls battery charger 13 such that the charge current is less than or equal to (does not exceed) the maximum current available for battery charging, or 400 mA.

Thus, controller 19 determines and/or takes into account (if the information is provided to controller 19) the amount of maximum charge current available (excess current or charging current or additional current available from power source 24 or, put another way, the amount of "headroom" in the current available from the supply voltage to use to charge battery 18) in determining whether to charge battery 18 and, if so, what amount of current is available for charging battery 18. Thus, controller 19 causes the charge current to not exceed (i.e., be equal to or less than) the current available for charging battery 18 (400 mA in the example above). This scheme allows battery charger 13 (more generally, power converter 20) to adapt to such situations, to accommodate a variety of supply voltages or sources, and to provide additional flexibility in its operation.

Referring again to FIG. 4, at 105, a determination is made (by controller 19 or other circuit) whether any current is available from power source 24 for use in the battery charging process. If not, battery 18 is not charged, given the limit imposed by the capabilities power source 24. If current (or power, generally) is available from power source 24 for use to charge battery 18, the process continues with battery charging.

In the exemplary embodiment shown in FIG. 4, the charging process includes three modes: pre-charge, constant current, and constant voltage. Other orders, types, and numbers of charging modes may also be used, as described above.

At 106, a pre-charge mode or stage is performed. Subsequently, a transition from the pre-charge mode is made, as described above. Thus, at 109, a constant current charging mode is used to charge battery 18.

Subsequently, a transition from the constant current mode is made, as described above. More specifically, at 112, a constant voltage charging mode is performed. The constant voltage charging mode may be terminated based on one or more conditions. At that point, battery 18 is charged. As noted above, a float charge mode may subsequently be used, as desired.

In exemplary embodiments, transitions between charging modes or stages may be done either automatically by controller 19 (e.g., depending on battery chemistry, characteristics, type, etc.), depending on user input, for example, as provided to controller 19 (e.g., the duration and/or order of various charging modes or stages), or a combination of the two, as desired. In other words, in some embodiments, controller 19 may use the system and/or battery parameters or information to make transitions between various charging modes, as described above.

In some embodiments, the user might change the charging modes, the durations of various modes, etc., as desired. In such a scenario, controller 19 changes the battery charging process or profile accordingly.

Note that the particular battery charging process or profile shown in FIGS. 3 and 4 and described above constitutes merely an example. Other battery charging processes, which may include one or more of different types of battery charging modes, are contemplated, and can be accommodated by battery charger 13.

For example, in some embodiments, charge signal 13A may support one or more pre-charge modes for charging battery 18. As another example, in some embodiments, charge signal 13A may support one or more constant current modes for charging battery 18. As another example, in some embodiments, charge signal 13A may support one or more constant voltage modes for charging battery 18. As another example, in some embodiments, charge signal 13A may support one or more float-charging modes for charging battery 18.

In some embodiments, battery charger 13 supports combining one or more of the battery charging modes described above with one or more battery charging modes, as desired. In this manner, a wide variety of battery charging processes or profiles may be supported, depending on factors such as design and performance specifications, the type of battery 18, the level of voltage and/or current available for charging battery 18, cost, complexity, etc.

For example, in some embodiments, a battery charging process may include a pre-charge mode, followed by a constant voltage mode, followed by a constant current mode. As another example, in some embodiments, a battery charging process may include a pre-charge mode, followed by a constant current mode, followed by a constant voltage mode. As another example, in some embodiments, a battery charging process may include a constant current mode followed by a constant voltage mode. As yet another example, in some embodiments, a battery charging process may include a constant voltage mode followed by a constant current mode. Furthermore, a float-charge mode may be used to complete the charging process in any of the examples discussed above, as persons of ordinary skill in the art will understand.

Note that controller 19 may cause the charging process to be altered or modified (or even stopped) in response to one or more conditions in apparatus 11 or other circuit, block, system, etc. An example, discussed above, relates to the temperature of one or more components, such as battery 18.

As another example, controller 19 may take into account and use information relating to the charging process in order to alter the charging process. For example, if the battery terminal voltage received by controller 19 falls or is below a threshold, $V_{pre}$, or above a threshold $V_{overvol}$, controller 19 may cause the charging cycle or process or profile or mode to change, as desired for example, by reducing the charge current or by stopping the charge process, etc.

As another example, if the charge current (provided via charge signal 13A) is below a threshold, $I_{low}$, indicating that the charge or output current is below a threshold, controller 19 may cause the charging cycle to change, for instance, for charging to stop and/or for charging to stop and a float charge mode to start, etc. As yet another example, controller 19 may take into account a signal or value $I_{BAT,\,max}$, which represents the maximum charging current for a given battery (in other words, the charging current for the battery should not exceed $I_{BAT,\,max}$). if the charge current reaches $I_{BAT,\,max}$, controller 19 may cause the charging cycle to change, for instance, for charging to stop and/or for charging to stop and a float charge mode to start, etc. This functionality helps to protect battery 18, battery charger 13, and or power source 24.

As noted, controller 19, working with battery charger 13, uses a feedback loop to control the charging process. The loop bandwidth and/or gain of the feedback loop, or generally of battery charger 13, may be predetermined or may be changed dynamically (e.g., depending on user input, circuit or system conditions, etc.).

In exemplary embodiments, some guidelines may be used to set the loop bandwidth of battery charger 13. Generally, the loop bandwidth of battery charger 13 should be higher than a minimum that allows reliable operation of protection circuitry. For example, battery 18 may include protection circuitry with a given detection window, say, 1 second. If the loop bandwidth of battery charger 13 is too low, a condition (e.g., too high a charge current) can trigger such protection circuitry before battery charger 13 takes corrective measures to remedy the condition.

Conversely, the loop bandwidth of battery charger 13 should not be too high so as to allow battery charger 13 to respond to spurious (e.g., noise) signals. Furthermore, having a relatively high loop bandwidth of battery charger 13 might generate relatively large charge voltage and charge current ripple.

As described above, as long as power source 24 provides sufficient power, battery charger 13 can charge battery 18 under the control of controller 19. In some embodiments, if power source 24 fails to provide sufficient power to load 27 or is removed or disconnected or power from power source 24 becomes unavailable or power source 24 becomes unavailable, battery 18 provides power to load 27. In this situation, battery charger 18 (more specifically, node 13A in FIGS. 1-2) receives power from battery 18, and provides power to load 27 through regulator 16, as the process flow diagram in FIG. 5 shows.

Figure 5:
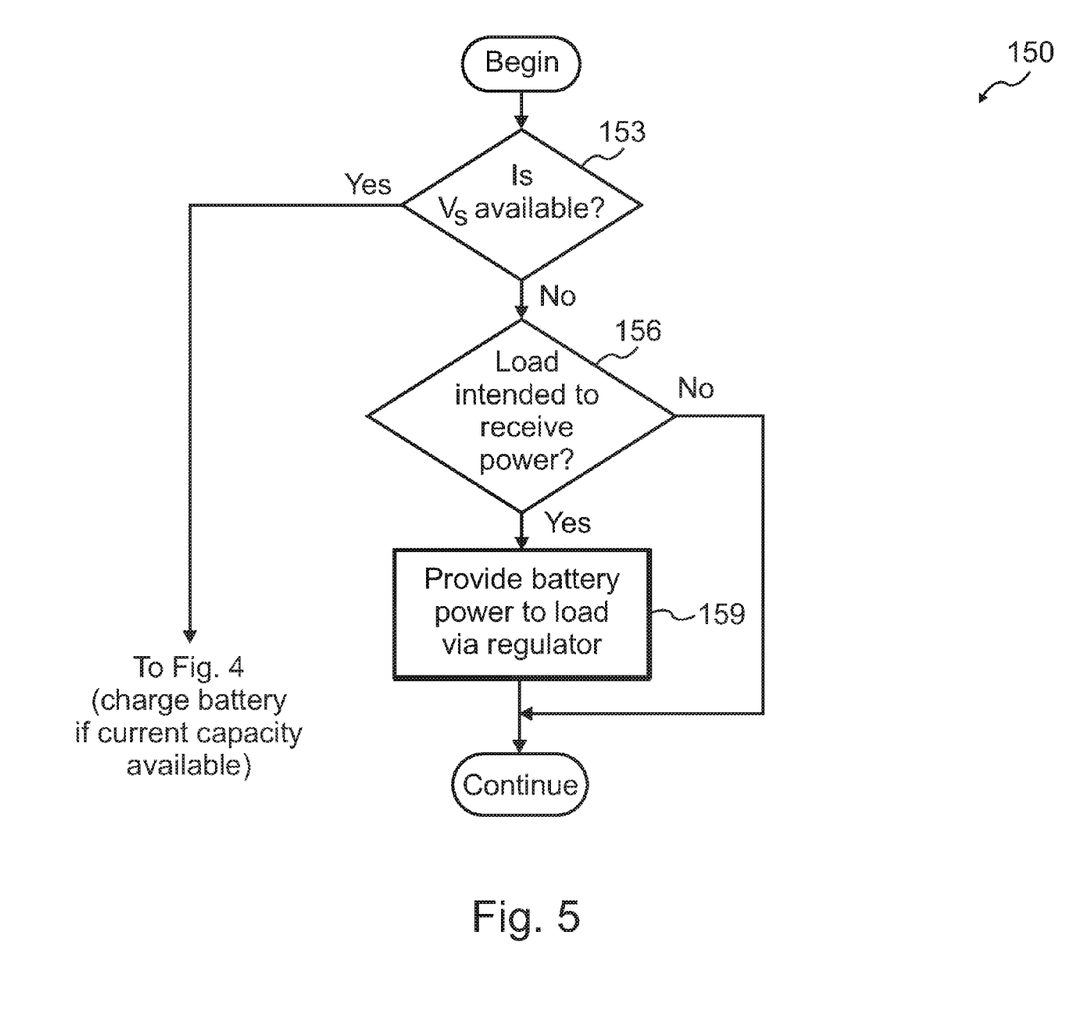
FIG. 5 depicts a flow diagram for a process of providing power to a load using a regulator and a battery charger according to an exemplary embodiment.

Referring to FIG. 5, at 153 a determination is made whether power is available from power source 24 (in sufficient quantity and/or of appropriate quality (e.g., voltage level)) to provide power to load 27. If so, the battery may be charged if the power or current capacity of power source 24 is sufficiently large, as described above, and shown in FIG. 4.

Referring again to FIG. 5, if sufficient power from power source 24 is not available, at 156 a determination is made whether load 27 should continue to receive power. For example, if the user removes power source 24 in an attempt to turn off or power down load 27, then battery 18 should not provide power to load 27.

Conversely, if, for example, an AC mains failure causes power source 24 to lose power while load 27 is being used, then battery 18 should be used to provide power to load 27. Regardless of the reason, if power should be provided to load 27, at 159 power is provided from battery 18 (via battery charger 13, more specifically, node 13A) to load 27 through regulator 16.

Another aspect of the disclosure relates to the design and/or topology of various blocks or circuits in regulator 16 and/or battery charger 13. More specifically, various blocks or circuits in 16 and/or battery charger 13, such as the embodiments shown in FIGS. 1-2, may be implemented in a variety of ways. Generally speaking, a number of techniques may be used to implement signal processing blocks, power processing or conversion blocks, control circuits, and the like, depending on factors such as design and performance specifications, available technology or process, complexity, cost, etc.

Figure 6:
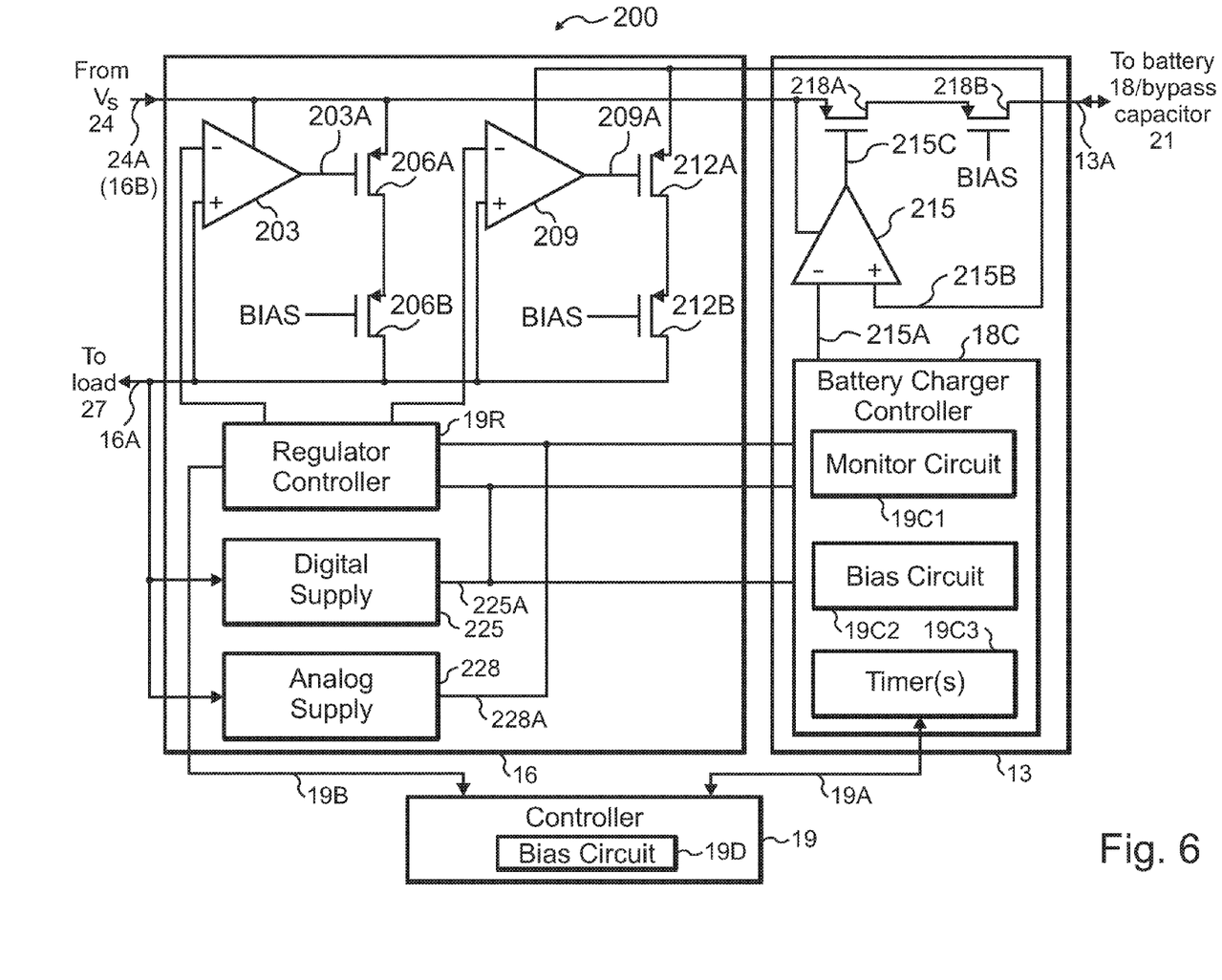
FIG. 6 illustrates a circuit arrangement for a regulator coupled to a battery charger according to an exemplary embodiment.

FIG. 6 illustrates a circuit arrangement 200 for a power converter, including regulator 16 coupled to battery charger 13. In the embodiment shown, some or all of the operations of regulator 16 are controlled by regulator controller 19R. Similarly, in the embodiment shown, some or all of the operations of battery charger 13 are controlled by battery charger controller 19C. Controller 19 controls the operations of both regulator controller 19R and battery charger controller 19C via signals provided at outputs 19B and 19A, respectively. As noted above, controller 19 may also receive status or other information from regulator controller 19R and/or battery charger controller 19C. Controller 19 also provides functions such as global bias or reference signals (e.g., one or more bandgap reference signals) by using bias circuit 19D.

In other embodiments, however, the functionality of one or both of regulator controller 19R and battery charger controller 19C may be included in or realized by controller 19. Other arrangements (e.g., control functions controlled by a source or circuit external to the power converter are contemplated and are possible, as desired.

Referring again to FIG. 6, a digital supply circuit (e.g., a regulator circuit) 225 and an analog supply circuit (e.g., a regulator) 228 are included in regulator 16. Digital supply circuit 225 and an analog supply circuit 228 provide, respectively, digital supply voltage 225A and analog supply voltage 228A at their outputs. Digital supply voltage 225A powers various digital circuits or devices, such as in controller 19, regulator controller 19R and battery charger controller 19C. Similarly, analog supply voltage 228A powers various digital circuits or devices, such as in controller 19, regulator controller 19R and battery charger controller 19C.

Battery charger controller 19C includes a variety of circuits to facilitate operation of battery charger 13 (generally, the operation of the power converter). In the example shown, monitor circuit 19C1 is used to monitor various signals or levels, such as the terminal voltage of battery 18 (not shown), temperature level(s), etc., as described above. Bias circuit 19C2 is used to provide bias signal(s) to appropriate circuitry in battery charger 13, such as to transistor 218B. One or more timers 19C3 are used to facilitate the charging operation, e.g., by measuring the amount of time spent in a given battery charging mode (e.g., constant current mode). Note that similar blocks of circuitry may be used in regulator controller 19R to facilitate its operation, as desired.

Battery charger 13 includes difference amplifier or comparator 215. One input of comparator 215 (the inverting input 215B in the example shown) is coupled to output 13A. Battery charger controller 19C drives another input (inverting input in the example shown) 215A of comparator 215. By applying an appropriate signal to input 215A of comparator 215, battery charger controller 19C (e.g., as controlled by controller 19) causes transistor 218A in order to charge battery 18 (not shown).

In the embodiment shown, transistor 218A is part of a cascode configuration. More specifically, transistor 218A and transistor 218B are coupled in a cascode configuration. The gate of transistor 218B is biased appropriately for the cascode operation. Using transistor 218B allows battery charger 13 to accommodate higher supply and/or battery terminal voltages than would using transistor 218A alone (i.e., without using a cascode configuration). Note that a non-cascode configuration (i.e., omitting transistor 218B) may also be used, as desired.

As noted above, a current sensing transistor (not shown) may be coupled to transistor 218A such that the two transistors have the same source-gate voltage (e.g., the respective sources coupled to each other, and the respective gates of the two transistors also coupled to each other). In this situation, the current sensing transistor (not shown) can provide a measure of the charge current provided to battery 18 (not shown).

If the width to length (W/L) ratios of transistor 218A and the current sensing transistor (not shown) are the same, then the two transistors conduct the same (or nearly same) current. Using different sizes (e.g., width to length ratios) for the two transistors, however, allows scaling by a desired ratio the charge current so that the current sensing transistor (not shown) conducts a smaller current, and may be made physically smaller. Doing so reduces the circuit area and also its overall power consumption.

Node 13A (output) of battery charger 13 is also coupled to transistor 212A. Transistor 212A may be used to provide power from battery 18 (not shown) to load 27 via node 16A. Note that during the battery charging process, transistor 212A is turned off by comparator 209, which is controller by regulator controller 19R (or by controller 19, which controls regulator controller 19R).

If, however, load 27 (not shown) is desired to be powered from battery 18 (not shown), regulator controller 19R turns on transistor 212A by driving an input of comparator 209 (the output voltage at output 16A drives another input of comparator 209). Conversely, regulator controller 19R turns off transistor 206A by driving an input of comparator 203 (the output voltage at output 16A drives another input of comparator 203). Transistor 212B receives an appropriate bias so that it is turned on. As a result, battery 18 (not shown) provides power via node 13A and transistors 218A-218B to output 16A of regulator 16. Consequently, load 27 (not shown) receives from output 16A.

As noted above, when battery 18 (not shown) is providing power to load 27 via transistor 212A, regulator controller 19R uses comparator 203 to turn off transistor 206A. On the other hand, when power source 24 (rather than battery 18 (not shown)) is to provide power to load 27 (not shown), regulator controller 19R uses comparator 203 to turn on transistor 206A. In this mode of operation, regulator controller 19R uses comparator 209 to turn off transistor 212A.

Thus, by selectably controlling transistors 206A and 212A, power source 24 or battery 18 provides power to load 27, respectively. Furthermore, by selectably controlling transistor 218A, charge signal 13A (e.g., charge current or voltage) is provided to battery 18.

Similar to transistor 218A described above, current sensing transistors (not shown) may be coupled to transistor 206A and/or transistor 212A. Using current sensing transistors allows sensing of the regulator current and battery current provided to power load 27 (not shown), respectively.

In the embodiment shown, transistor 212A is part of a cascode configuration. More specifically, transistor 212A and transistor 212B are coupled in a cascode configuration. The gate of transistor 212B is biased appropriately for the cascode operation. Using transistor 212B allows regulator 16 to accommodate higher supply and/or battery terminal voltages than would using transistor 212A alone (i.e., without using a cascode configuration). Note that a non-cascode configuration (i.e., omitting transistor 212B) may also be used, as desired.

Similarly, in the embodiment shown, transistor 206A is part of a cascode configuration. More specifically, transistor 206A and transistor 206B are coupled in a cascode configuration. The gate of transistor 206B is biased appropriately for the cascode operation. Using transistor 206B allows regulator 16 to accommodate higher supply and/or battery terminal voltages than would using transistor 206A alone (i.e., without using a cascode configuration). Note that a non-cascode configuration (i.e., omitting transistor 206B) may also be used, as desired.

Figure 7:
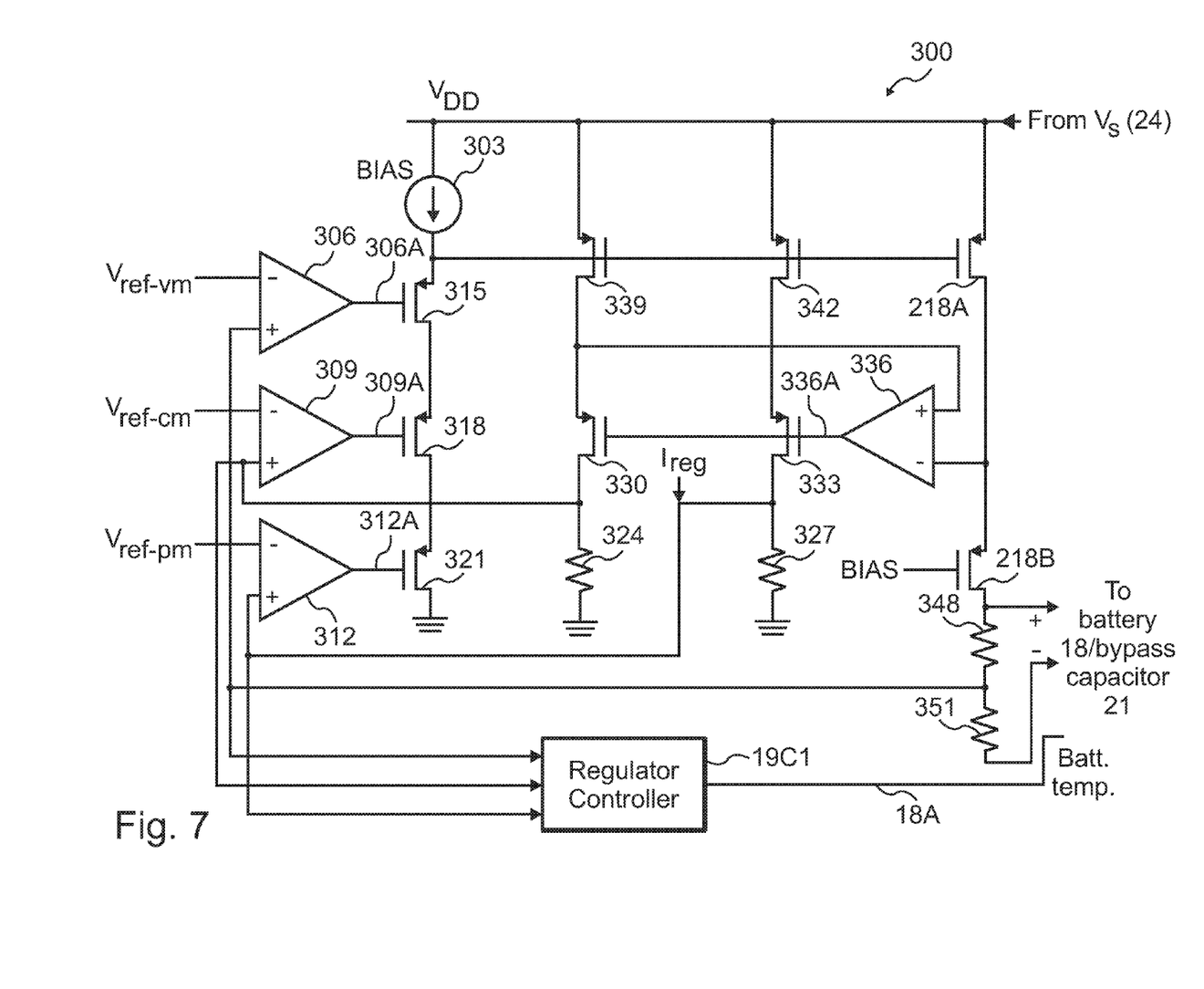
FIG. 7 depicts a circuit arrangement for using a winner take all (WTA) circuit a battery charger according to an exemplary embodiment.

FIG. 7 depicts a circuit arrangement 300 for controlling some of the operations of a battery charger by using a winner take all (WTA) circuit. Some of the circuitry shown in FIG. 7 (e.g., excluding transistors 218A-218B may be included in controller 19 and/or battery charger controller 19C).

Referring again to FIG. 7, the WTA circuit includes transistors 315, 318, and 321, which are coupled in a cascade configuration driven by a bias current provided by current source 303. Outputs 306A, 309A, and 312A of comparators or difference amplifiers 306, 309, and 312 drive the gates of transistors 315, 318, and 321, respectively. The output of the WTA circuit, at the source of transistor 315, follows the winner or winning transistor, or the highest voltage among the respective gate voltages of transistors 315, 318, and 321.

The output of the WTA circuit, the source of transistor 315, drives a current mirror that includes transistors 339, 342, and 218A. By controlling the current flowing through transistor 218A, the WTA circuit controls the charge current provided to battery 18 (not shown). Transistors 339, 342, and 218A conduct the same amount of current as scaled by their respective relative W/L ratios. Generally, because of the higher currents (the charge current for battery 18 (not shown)) it conducts, transistor 218A has a larger W/L ratio than do transistors 339 and 342.

In some embodiments, transistor 218A may be implemented as a plurality of MOSFETs coupled in parallel. The MOSFETs coupled in parallel may have the same or different sizes (e.g., W/L ratios) as transistor 218A. By turning on one or more of the MOSFETs (e.g., by controller 19 (not shown)), the effective size (W/L ratio) of transistor 218A may be varied. As a result, a desired ratio of the currents conducted by transistors 339 and 342 (compared to the current conducted by transistor 218A) may implemented or maintained. Note that a similar arrangement of a plurality of MOSFETs in parallel may be used for transistors 206A and/or 212A (see FIG. 6), as desired.

Referring again to FIG. 7, output 336A of amplifier (e.g., operational amplifier) 336 drives the gates of transistors 330 and 333. The inverting input of amplifier 336 is coupled to the node between the drain of transistor 339 and the source of transistor 330. The non-inverting input of amplifier 336 is coupled to the drain of transistor 218A. By virtue of a negative feedback loop around amplifier 336, output 336A drives the gates of transistors 330 and 333 so as to force the drain-source voltages of transistors 330 and 333 to be the same or nearly the same as the drain-source voltage of transistor 218A.

Transistors 330 and 333 provide their respective drain currents to resistors 324 and 327. Furthermore, the current through regulator 16 (to provide power to load 27 (not shown), $I_{reg}$ (or a scaled version of it), for instance as measured by a current sensing transistor coupled to transistor 206A (see FIG. 6), as described above, is provided the node between the drain of transistor 333 and resistor 327. The voltages across resistors 324 and 327 drive, respectively, the non-inverting inputs of amplifiers 309 and 312 in the WTA circuit. The battery terminal voltage is scaled by resistors 348 and 351, and the resulting voltage is provided to the non-inverting input of amplifier 306 in the WTA circuit.

Reference voltages $V_{ref\_pm}$ (denoting power path mode control), $V_{ref\_cm}$ (denoting current mode control), and $V_{ref\_vm}$ (denoting voltage mode control) drive, respectively, the inverting inputs of amplifiers 312, 309, and 306. $V_{ref\_pm}$ represents the maximum available current from $V_s$, and $V_{ref\_cm}$ represents the maximum charging current from $V_s$. Note that $V_{ref\_pm}$ is usually higher than $V_{ref\_cm}$. $V_{ref\_vm}$ represents the target battery voltage (e.g., full-charge terminal voltage or some other target or desired voltage).

When the battery voltage (the terminal voltage of battery 18 (not shown) is lower than the target voltage and $I_{reg}$ is low, output 306A of amplifier 306 and output 312A of amplifier 312 go low, and meanwhile output 309A of amplifier 309 goes high. More specifically, transistors 315 and 321, by virtue of low gate voltages, turn on and essentially act as short circuits or paths of relatively small resistance/impedance. In this situation, amplifier 309 and transistor 318 are the winner of the WTA circuit. The charge circuit or charger regulates the charging current such that $V_{fb\_pm}$ is relatively close or very close to $V_{ref\_cm}$, and the charger is in the constant current mode control.

When the battery voltage is lower than target voltage and $I_{reg}$ is high, output 306A of amplifier 306 and output 309A of amplifier 309 go low, and meanwhile output 312A of amplifier 312 goes high. Consequently, amplifier 312/transistor 321 are the winner of the WTA circuit. The charger regulates the charging current such that $V_{fb\_pm}$ is very close or relatively close to $V_{ref\_pm}$, and the charger is in the power path mode control.

When the battery voltage is relatively close to the target voltage and $I_{reg}$ is low, output 309A of amplifier 309 and output 312A of amplifier 312 go low, and meanwhile output 306A of amplifier 306 goes high. Consequently, amplifier 306/transistor 315 are the winner of the WTA circuit. The charger regulates the charging current such that $V_{fb\_vm}$ is very close or relatively close to $V_{ref\_vm}$, and the charger is in the constant voltage mode control. The winner among 306A, 309A, and 312A indicates the charge mode of the charger.

In the embodiment shown, the signals at the non-inverting inputs of amplifiers 306, 309, and 312 are provided to regulator 19C. In this manner, regulator 19C can determine the occurrence of various conditions (e.g., over-voltage, under-voltage, charge termination, etc.), and take appropriate or desired action, as described above. Furthermore, in the embodiment shown, signal 18A, representing the temperature of battery 18 (not shown) is provided to regulator controller 19C. By monitoring signal 18A, regulator controller 19C can determine conditions such as excessive battery temperature, and take appropriate or desired action, as described above.

Figure 8:
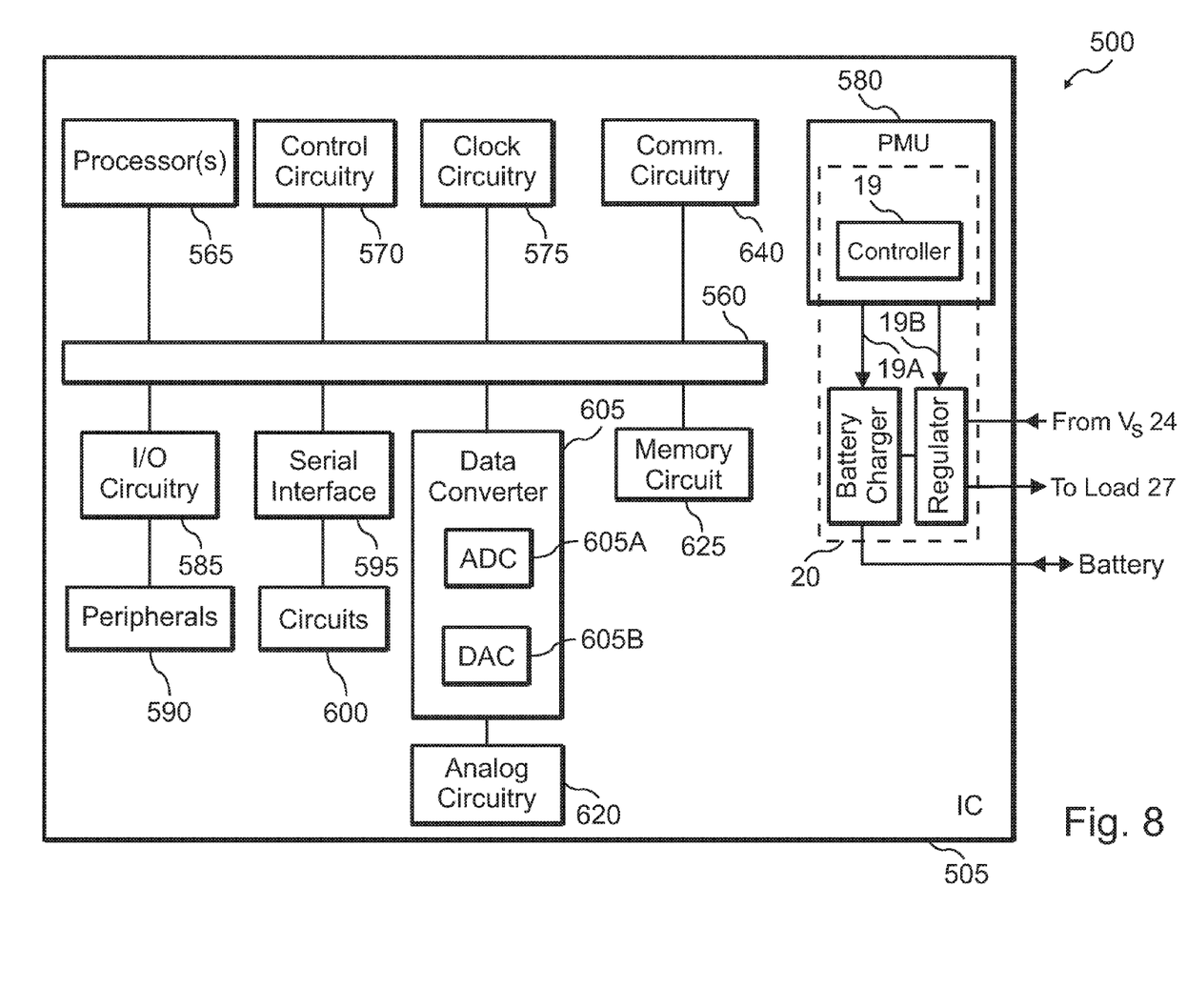
FIG. 8 shows a block diagram of an integrated circuit (IC), including a microcontroller unit (MCU), according to an exemplary embodiment.

As noted, power converter 20 (including battery charter 13 and regulator 16) may be used in a variety of circuits, blocks, subsystems, and/or systems. For example, in some embodiments, power converter 20 may be integrated in an IC, including an MCU. FIG. 8 shows a circuit arrangement 500 of such an embodiment.

Circuit arrangement 500 includes an IC 505, which constitutes or includes an MCU. IC 505 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductors for communicating information, such as data, commands, status information, and the like.

IC 505 may include link 560 coupled to one or more processors 565, clock circuitry 575, and power management circuitry or PMU 580. In some embodiments, processor(s) 565 may include circuitry or blocks for providing computing functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 505. Clock circuitry 575 may also control the timing of operations that use link 560. In some embodiments, clock circuitry 575 may provide one or more clock signals via link 560 to other blocks in IC 505.

In some embodiments, PMU 580 may reduce an apparatus's (e.g., IC 505) clock speed, turn off the clock, reduce power, turn off power, or any combination of the foregoing with respect to part of a circuit or all components of a circuit. Further, PMU 580 may turn on a clock, increase a clock rate, turn on power, increase power, or any combination of the foregoing in response to a transition from an inactive state to an active state (such as when processor(s) 565 make a transition from a low-power or idle or sleep state to a normal operating state).

In the embodiment shown, PMU 580 includes controller 19. Controller 19 couples to and controls battery charger 13 and regulator 16, described above in detail. Note that in some embodiments, battery charger 13 and/or regulator 16 may be included in PMU 580, as desired. In some embodiments, which may be battery charger 13 and/or regulator 16 may be integrated or fabricated outside IC 505, as desired. Furthermore, although load 27 is shown as external to IC 505, load 27 may include or may constitute some or all of the circuitry in IC 505 (other than power converter 20, which facilitates the provision of power to such circuits).

Referring again to FIG. 8, link 560 may couple to one or more circuits 600 through serial interface 595. Through serial interface 595, one or more circuits coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with other blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to IC 505. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. Note that in some embodiments, such peripherals may be external to IC 505, as described above.

Link 560 may couple to analog circuitry 620 via data converter 605. Data converter 405 may include one or more ADCs 605B and/or one or more DACs 605A. The ADC(s) 615 receive analog signal(s) from analog circuitry 620, and convert the analog signal(s) to a digital format, which they communicate to one or more blocks coupled to link 560.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 505 to form more complex systems, sub-systems, control blocks, and information processing blocks, as desired.

Control circuitry 570 couples to link 560. Thus, control circuitry 570 may communicate with and/or control the operation of various blocks coupled to link 560. In addition, control circuitry 570 may facilitate communication or cooperation between various blocks coupled to link 560.

In some embodiments, control circuitry 570 may initiate or respond to a reset operation. The reset operation may cause a reset of one or more blocks coupled to link 560, of IC 505, etc., as person of ordinary skill in the art will understand. For example, control circuitry 570 may cause PMU 580 (and thus controller 19) to reset to an initial state.

In exemplary embodiments, control circuitry 570 may include a variety of types and blocks of circuitry. In some embodiments, control circuitry 570 may include logic circuitry, finite-state machines (FSMs), or other circuitry to perform a variety of operations, such as the operations described above. Controller 19 may be implemented in a similar manner, as desired.

Communication circuitry 640 couples to link 560 and also to circuitry or blocks (not shown) external to IC 505. Through communication circuitry 640, various blocks coupled to link 560 (or IC 505, generally) can communicate with the external circuitry or blocks (not shown) via one or more communication protocols. Examples include USB, Ethernet, and the like. In exemplary embodiments, other communication protocols may be used, depending on factors such as specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc. Memory circuit 625 provides storage for various information or data in IC 505, such as operands, flags, data, instructions, and the like, as persons of ordinary skill in the art will understand. memory circuit 625 may support various protocols, such as double data rate (DDR), DDR2, DDR3, and the like, as desired. In some embodiments, the memory read and/or write operations involve the use of one or more blocks in IC 505, such as processor(s) 565. A direct memory access (DMA) arrangement (not shown) allows increased performance of memory operations in some situations. More specifically, the DMA (not shown) provides a mechanism for performing memory read and write operations directly between the source or destination of the data and memory circuit 625, rather than through blocks such as processor(s) 565.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a voltage regulator to regulate a voltage from a power source and to provide an output current at an output;
a battery charger, coupled to the voltage regulator, to provide a charge current; and
a controller to control the charge current such that the charge current is less than or equal to a current available from the power source minus the output current.

2. The apparatus according to claim 1, further comprising a battery coupled to receive the charge current from the battery charger.

3. The apparatus according to claim 1, wherein the current available from the power source comprises a maximum current of the power source.

4. The apparatus according to claim 1, wherein the controller further controls the charge current using a feedback loop responsive to a terminal voltage of a battery coupled to receive the charge current.

5. The apparatus according to claim 4, wherein the feedback loop is further responsive to the charge current.

6. The apparatus according to claim 1, wherein the regulator comprises a first transistor to provide the output current.

7. The apparatus according to claim 6, wherein the regulator further comprises a second transistor to couple battery power to the output of the regulator in order to provide the output current if power from the power source becomes unavailable.

8. The apparatus according to claim 7, wherein the controller turns off the first transistor and turns on the second transistor for the battery power to provide the output current.

9. The apparatus according to claim 1, wherein the controller comprises a winner take all circuit.

10. An apparatus, comprising:
a voltage regulator to provide an output current to a load, the regulator comprising a first transistor to selectably provide the output current using a first power source, the regulator further comprising a second transistor to selectably provide the output current using a second power source;
a battery charger, coupled to the voltage regulator, to provide a charge current; and
a controller to control the charge current such that the charge current is derived from a maximum current available from the first power source and the output current.

11. The apparatus according to claim 10, wherein the second power source comprises a battery.

12. The apparatus according to claim 10, wherein the charge current is provided to the battery.

13. The apparatus according to claim 10, wherein the charge current is provided in a constant current mode or in a constant voltage mode.

14. The apparatus according to claim 10, wherein the charge current is less than or equal to the maximum current available from the first power source minus the output current.

15. A method of processing power, the method comprising:
regulating a voltage from a power source and providing an output current;
providing a charge current from a battery charger coupled to the voltage regulator; and
controlling the charge current such that the charge current is less than or equal to a current available from the power source minus the output current.

16. The method according to claim 15, wherein providing the charge current from the battery charger further comprises charging a battery with the charge current.

17. The method according to claim 15, wherein the current available from the power source comprises a maximum current of the power source.

18. The method according to claim 15, wherein controlling the charge current further comprises using a feedback loop responsive to a terminal voltage of a battery coupled to receive the charge current.

19. The method according to claim 18, wherein the feedback loop is further responsive to the charge current.

20. The method according to claim 15, wherein controlling the charge current further comprises controlling the charge current in a constant current mode or controlling the charge current in a constant voltage mode.

* * * * *